Figure 1:
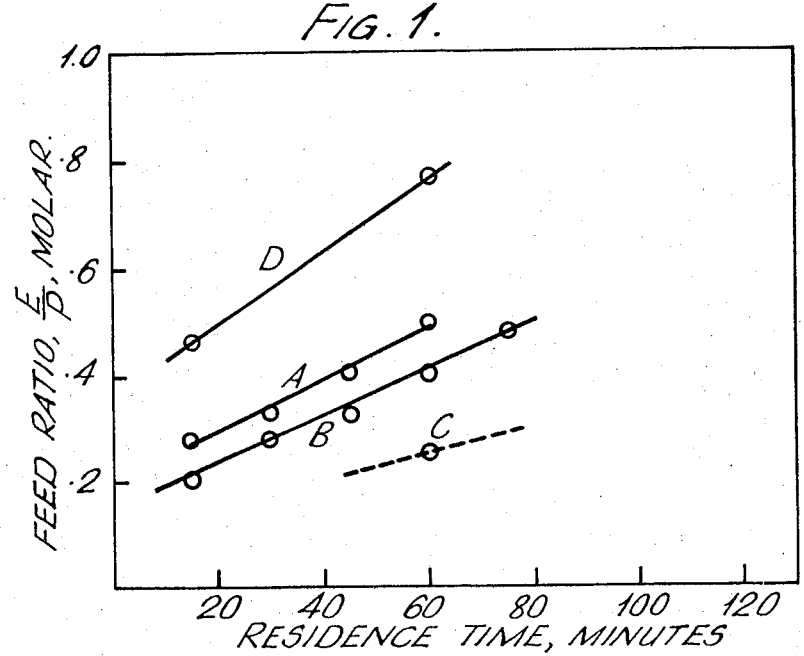

Inventors
John F. Henderson
David Carnell
By Stevens, Davis, Miller & Mosher
Attorneys

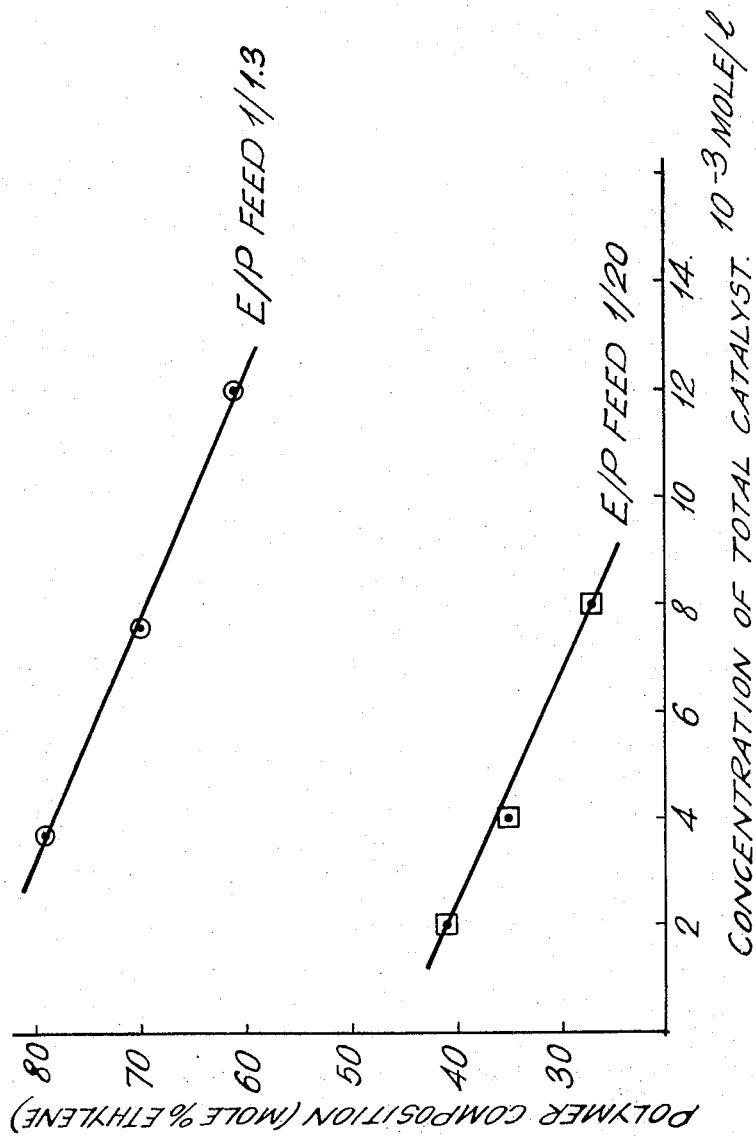

United States Patent Office 3,294,766
Patented Dec. 27, 1966

3,294,766
POLYMERIZATION PROCESS
John F. Henderson and David Carnell, Sarnia, Ontario, Canada, assignors to Polymer Corporation Limited, Sarnia, Ontario, Canada, a body corporate and politic
Filed Apr. 10, 1963, Ser. No. 271,501
Claims priority, application Canada, May 10, 1962, 848,771/62
15 Claims. (Cl. 260—80.5)

This invention relates generally to the copolymerization of olefinic compounds having widely differing reaction rates. It is particularly concerned with the production of homogeneous copolymers of ethylene with at least one copolymerizable olefinic compound and especially with the copolymerization of ethylene and propylene with which a minor proportion of another olefin may be copolymerized.

It is now well known that olefins may be polymerized at relatively low temperatures by means of the so-called Ziegler catalysts, i.e. a transition metal compound used in combination with an organo-metallic compound. Various olefins such as ethylene, propylene, butylene, butadiene, isoprene, styrene and the like can be polymerized to produce high molecular weight polymers and copolymers using these catalyst systems. Considerable interest has developed in these processes since they permit the production of polymers having specific molecular configurations. Since the molecular configuration determines the physical properties of a polymer, its regulation is highly desirable in order to obtain a polymer suitable for certain specific requirements. For example, polybutadiene and polyisoprene which are essentially all in the cis configuration have properties similar to Hevea rubber and hence may be used as a substitute therefor in applications such as tires. On the other hand, polyethylene, as prepared using these catalyst systems is a tough resinous material having a high degree of crystallinity at ordinary temperatures and generally lacking in rubber-like properties.

However, certain copolymers of ethylene with other copolymerizable olefins are largely amorphous and show rubber-like elasticity at room temperature or below. These copolymers are generally described as copolymers of ethylene with one or more 1-olefins having the formula $CH_2=CHR$ in which R is a saturated alkyl hydrocarbon radical having from 1 to 10 carbon atoms. The particular copolymers which have attracted most attention are copolymers of ethylene and propylene. Since these copolymers are completely saturated, their ageing properties are vastly superior to those of unsaturated rubbers. However, up to the present they have had inferior rubbery properties because of their lack of homogeneity and because of their tendency to crystallize. To achieve the best rubbery properties in copolymers of ethylene with 1-olefins, it is necessary to produce polymers in which the number of units of one monomer which are adjacent to each other are kept to a minimum. For example, a polymer which contains blocks of ten ethylene units in sequence contains sufficient crystallinity to detract from its rubbery properties at room temperature.

Numerous attempts have been made to produce completely amorphous copolymers of ethylene. Because of the wide difference between the reactivity of ethylene and of linear 1-olefins, it has proven very difficult to produce completely amorphous copolymers. For example, in the copolymerization of ethylene and propylene in the region of room temperature, ethylene is more than twenty times more reactive than propylene, and it is difficult to incorporate enough propylene into the copolymer molecule, randomly distributed along the molecular chain, to give an amorphous copolymer. The composition of the copolymer produced at any instant in a copolymerization process depends upon the relative proportions of ethylene and 1-olefin in the reaction mixture. In such a reaction mixture, as an increment of polymer is produced the relative proportion of the comonomers changes because of the wide difference between the reaction rate of the ethylene and of the 1-olefin. The result is that there is a continuous enrichment of the unpolymerized mixture in the less reactive monomer and therefore each increment of copolymer produced has a different comonomer composition from the increment produced previously. For example, in the copolymerization of ethylene and propylene, ethylene is used up at a faster rate than propylene and, as the copolymerization reaction proceeds, the successive increments of copolymer have an increasing propylene content. It has therefore been recognized that in order to produce copolymers of uniform or homogeneous composition with respect to the comonomers, it is necessary to maintain the relative proportions of ethylene and 1-olefin in the reaction mixture at a constant value during the course of the copolymerization.

The method which has been used in previous attempts to produce amorphous copolymers of ethylene and 1-olefins, for example propylene, is to carry out the reaction in a batch process using a partially filled reactor containing both a liquid and a vapour phase and continuously adding monomers in such proportions as to maintain a constant ratio in the liquid phase as copolymerization proceeds. The copolymerization takes place in the liquid phase which contains the catalyst and the relative proportions of monomers therein are held constant throughout the polymerization reaction by maintaining a constant composition in the gas phase. This is achieved by initially saturating the liquid medium in the reactor, usually an aliphatic liquid such as hexane, with a mixture of ethylene and propylene of the composition required to produce the desired copolymer and initiating copolymerization by addition of the catalyst. As soon as the copolymerization reaction starts, a mixture of ethylene and propylene is fed continuously to the reactor in the same relative proportions as in the copolymer produced. Catalyst is also added continuously, if desired, to sustain the copolymerization reaction. The proportions of ethylene and propylene in the liquid phase are usually maintained by continuously analyzing the gas phase which is in equilibrium with the liquid phase and adjusting the feed stream accordingly. The reaction is continued until the reaction mixture becomes too viscous for suitable agitation or until the reactor is full. The addition of reactants is then stopped and the polymer solution removed from the reactor. Residual catalyst is usually deactivated by the addition of an alcohol. The reactor is then cleaned before charging is begun for the production of the next batch of copolymer. However, even using such carefully controlled conditions, it has not been possible to produce copolymers which are completely homogeneous with respect to comonomer content and it has not been possible to produce amorphous copolymers which are the equivalent of the well-known rubbers such as high cis polybutadiene or Hevea rubber. Furthermore, such processes suffer the serious disadvantage of requiring a large proportion of downtime when the equipment is unproductive. But, up to the present, a satisfactory means of overcoming these disadvantages has not been developed.

The inventors have now developed a process for the continuous production of copolymers of ethylene and copolymerizable olefinic compounds which results in the production of copolymers having a greater degree of homogeneity than was previously possible. By operating according to this process, it is possible to produce homogeneous copolymers having a desired ethylene content at a high level of monomer conversion.

The object of the invention is to provide a continuous process for the production of homogeneous copolymers of ethylene with at least one copolymerizable olefinic compound.

A further object of the invention is to provide such a process in which the ethylene content of the product is deliberately regulated by the polymerization conditions.

A still further object is to provide an improved amorphous copolymer of ethylene and a linear 1-olefin with, if desired, a minor proportion of another copolymerizable olefin.

The object of the invention is achieved by the continuous process for producing a copolymer of ethylene and at least one copolymerizable olefinic compound said copolymer having a specific comonomer composition within the range between 10 and 90 mole percent ethylene which comprises continuously feeding to a reaction zone containing a rapidly agitated reaction mixture a feed stream comprising ethylene, said olefinic compound and a catalytic amount of a catalyst effective in copolymerizing ethylene and said olefinic compound, and continuously withdrawing from said reaction zone a liquid product stream containing the copolymerization product, the rate of addition of each of ethylene, said olefinic compound and said catalyst being constant, the rate at which said feed stream enters said reaction zone being constant and equal to the rate at which said product stream is withdrawn from said reaction zone whereby to maintain a constant volume of liquid in said reaction zone thereby establishing a constant residence time and maintaining steady state conditions throughout said reaction mixture, the mole ratio of ethylene to said olefinic compound in the feed stream, the residence time and the total catalyst concentration in the feed stream being deliberately selected in relation to each other to result in a copolymer having said specific comonomer composition, the selection having regard for the fact that the proportion of units derived from ethylene in the polymer produced is a function of $E_F/CT$ where $E_F$ represents the mole percent ethylene of the total monomers in the feed, T represents residence time and C represents the total catalyst concentration in the reactor.

In one of its specific aspects the object of the invention is achieved in the continuous process for producing an improved amorphous copolymer comprising ethylene and propylene said copolymer having a specific comonomer composition within the range between 40 and 75 percent ethylene which comprises continuously feeding to a reaction zone containing a rapidly agitated reaction mixture a feed stream comprising a non-reactive organic liquid, ethylene, propylene and a hydrocarbon soluble catalyst formed by mixing a vanadium compound with a compound having the formula $AlR'_{3-n}X'_n$ where R' is a hydrocarbon radical having 1–12 carbon atoms, X' is a halogen atom, and continuously withdrawing from said reaction zone a product stream containing copolymer dissolved in said organic liquid, the rate of addition of ethylene, propylene, and said catalyst being constant, the rate at which said feed stream enters said reaction zone being constant and equal to the rate at which said product stream is withdrawn from said reaction zone, whereby to maintain a constant volume of liquid in said reaction zone thereby establishing a constant residence time and maintaining steady state conditions throughout said reaction mixture, the mole ratio of ethylene to propylene in the feed stream, the residence time and the total catalyst concentration in the feed stream being deliberately chosen in relation to each other to result in a copolymer having said specific comonomer composition, the selection having regard for the fact that the proportion of units derived from ethylene in the polymer produced is a function of $E_F/CT$ where $E_F$ represents the mole percent ethylene the total monomers in the feed, T represents residence time and C represents the total catalyst concentration in the reactor, the mole ratio of ethylene to propylene in the feed stream being between 3/1 and 1/50 and the residence time being greater than 10 minutes.

The present invention provides a continuous method for the copolymerization of ethylene and a copolymerizable olefinic compound to produce a copolymer of improved homogeneity. It particularly provides a means for producing amorphous copolymers which are more homogeneous than those produced previously. For example, amorphous polymers of ethylene and propylene when copolymerized according to the present invention are of such improved homogeneity that they have improved rubbery properties as compared to similar copolymers produced using the prior art processes. The term "amorphous" is used herein to designate copolymers which at room temperature are completely free of crystallinity which is detectable by X-ray measurements. In the past it has been considered that ethylene-propylene copolymers which contain from about 0.1 to 0.5% crystallinity, as determined by X-ray measurements are suitable for use as rubbers. Thus, it has been recognized that for the best rubbery properties the copolymers should contain less than about 0.5% crystallinity as determined by X-ray measurements. The inventors have now found that copolymers which are free of crystallinity as determined by X-ray measurements may still possess properties indicative of the presence of small amounts of crystallinity which detract from their rubber-like properties. By practicing the present invention, it has been found that copolymers may be produced which are completely free of crystallinity as determined by X-ray measurements and which contain a significantly higher degree of homogeneity than the prior art copolymers. The solubility characteristics of these copolymers are determined by their compositional homogeneity and therefore provide a convenient means of characterizing them. For example, copolymers of ethylene and propylene which contain blocks of ethylene units sufficient to result in between 0.1 and 0.5% X-ray crystallinity at room temperature are usually only about 70–75% soluble in pentane at 20° C. In order to dissolve greater proportions of such polymers, solvents at higher temperatures such as boiling heptane must be used. Homogeneous, amorphous ethylene-propylene copolymers containing from 40 to 75% bound ethylene which are 100% soluble in pentane at 20° C. and are at least 85% soluble in heptane at −15° C. can be produced by the practice of the present invention. Furthermore with suitable catalyst choice copolymers containing 40 to 67% ethylene can be produced having compositional homogeneity such that they show no significant crystallizability at 0° C. under 20% strain when determined in stress-temperature measurements as described hereinafter. Some of these copolymers have resilience characteristics similar to those of natural rubber and show heat build-up values of less than 34 centigrade degrees and in some cases even less than 28 centigrade degrees.

The invention may be used for the copolymerization of ethylene and copolymerizable olefinic compounds in a wide variety of systems in which the ethylene and the copolymerizable compound have widely differing reaction rates. The preferred olefinic compounds which are copolymerized with ethylene are linear 1-olefins having the formula $CH_2=CHR$ in which R is a saturated alkyl hydrocarbon radical having from 1 to 10 carbon atoms. Examples of such compounds are propylene, butene-1, pentene-1, hexene-1, and the like. The process of the invention may be used for the production of copolymers containing from about 10 to 90 mole percent bound ethylene although it is particularly useful for the production of copolymers having from about 30 to 80% bound ethylene. While the use of the invention produces copolymers over this wide range of compositions which have improved homogeneity over those produced by prior art processes, it is only the copolymers containing from about 40 to 75% bound ethylene which have rubbery properties over a wide temperature range whereas only those containing from 40 to 67% bound ethylene have the best rubber-like properties over the widest temperature range. The copolymers may contain more than one 1-olefin if desired. For example, they may be copolymers of ethylene, propylene and butene-1; of ethylene, propylene and hexene-1; of ethylene, propylene, butene-1 and hexene-1, or of any other desired combination of ethylene with the 1-olefins designated above. Other copolymerizable olefinic compounds may be copolymerized with ethylene in place of or in addition to the 1-olefins described above. For example, conjugated diolefinic compounds such as butadiene-1,3, isoprene, and 2,3 dimethyl butadiene may be copolymerized with ethylene. The copolymerization of small quantities of certain compounds with ethylene and linear 1-olefins has been found to be particularly desirable for incorporating into amorphous copolymers small amounts of unsaturation which renders the copolymers sulfur vulcanizable in conventional rubber compounding recipes. Thus nonconjugated dienes such as 1,5-hexadiene, 1,4-pentadiene, and longer chain aliphatic diolefins having alpha unsaturation can be copolymerized with ethylene and propylene. Similarly unsaturation may be introduced by the copolymerization of certain cyclic diolefins such as dicyclopentadiene, tricyclopentadiene, tetracyclopentadiene, vinyl norbornene and the like. The present invention is not limited with respect to the olefinic compounds which are copolymerized with ethylene since its practice is concerned with the process of producing copolymers of improved homogeneity using any comonomer which copolymerizes but at a rate differing widely from that of ethylene. However, it is of particular advantage in copolymerizing ethylene and propylene to produce homogeneous amorphous copolymers having a bound ethylene content between 40 and 75% by weight. This particular advantage is also obtained when a minor proportion (for example, up to about 10 mole percent) of another comonomer which may be another 1-olefin as defined above, a cyclic or aliphatic diene such as dicyclopentadiene, norbornene, 1,5-hexadiene and the like is copolymerized with the ethylene and propylene.

The advantages of the invention may be realized in any system for the copolymerization of ethylene and a copolymerizable olefinic compound which is carried out at a relatively low temperature and pressure and in which the reaction rates of the monomers differ widely. For example, the system may be one in which ethylene polymerizes at twice the rate at which the copolymerizable olefinic compound polymerizes or in which it polymerizes at 50 times the rate at which the copolymerizable olefinic compound polymerizes. The catalyst systems which may be used must be soluble in hydrocarbons and involve a mixture of a compound of a transition metal and an organo metallic reducing agent.

The reducing agents which may be used are organo-metallic compounds of specified metals of Groups I$a$, II and III$a$ of the Periodic System. Examples of such compounds which may be used include methyl sodium, ethyl sodium, butyl sodium, amyl sodium, butyl lithium, amyl lithium, dodecyl lithium and the like as well as compounds such as dimethyl zinc, diethyl zinc, di-n-butyl zinc, dimethyl mercury, diisopropyl mercury, ethyl magnesium chloride, ethyl magnesium bromide, propyl magnesium chloride, pentyl magnesium bromide, phenyl magnesium bromide, naphthyl magnesium iodide, various aluminum trialkyls such as aluminum trimethyl, aluminum triethyl, aluminum triisobutyl, and aluminum trihexyl, as well as dialkyl aluminum monohalides, such as diethyl aluminum monohalides, such as diethyl aluminum monochloride, dialkyl aluminum monoalkoxides, such as diethylaluminum ethoxide, monoalkyl aluminum dihalides such as monoethyl aluminum dichloride and dialkyl aluminum hydrides such as diethyl aluminum hydride. The transition metal compounds which may be used are selected from compounds of specified heavy metals of Groups IVB, VB, VIB, and VIII and particularly of titanium, zirconium, vanadium, uranium, thorium, chromium, iron, nickel, and cobalt. The salts of the heavy metals which may be used include halides, complex halides, oxyhalides, alkoxides, carboxylates, acetyl acetonates, and the like. The requirement that the catalyst system must be soluble in hydrocarbon places a limitation on the choice of transition metal compound which may be used. However those skilled in the art can, by simple experimentation, determine the combinations of organometallic compound and transition metal compound which produce hydrocarbon soluble compounds. The term "hydrocarbon soluble" is intended to include systems in which the catalyst may not be in true solution but in which it is in such a finely divided form that it appears by visual inspection to be in true solution. For example it contains no visible particles of catalyst. It is to be understood also that not all of the catalyst mixtures included in the above list are effective in producing copolymers of ethylene but that the catalysts used in practicing the invention are to be selected therefrom.

In practicing the present invention in the production of improved amorphous copolymers of ethylene and a linear 1-olefin such as propylene the catalyst systems which are preferred are formed by mixing a vanadium compound with an organo-aluminum compound. The most useful vanadium compounds may be represented by the general formulae $VOZ_{p-n}X_n$ and $VZ_{r-m}X_m$ where Z is an organic group attached to the vanadium through an oxygen atom, X is halogen, $p$ is 2–3, $n$ is 0–3 and not greater than $p$, $r$ is 3–4, and $m$ is 0–4 and not greater than $r$. These include vanadium halides such as $VOCl_2$, $VOBr_3$, $VCl_4$, $VBr_4$, $VCl_3$ and vanadium compounds having one or more organic groups. The compounds which are preferred for the production of amorphous copolymers are those which have at least one organic group Z selected from alkoxide, aryloxide, diketone, ketoester and carboxyl groups containing from 1 to 20 carbon atoms. Examples of such compounds are: alkoxy compounds such as triethyl orthovanadate, di-n-butyl bromo orthovanadate, hexyl dichloro orthovanadate, vanadyl di-sec.-butoxide, vanadyl iodo octyloxide, vanadium trichloromonobutoxide, and vanadium bromo dibutoxide; aryloxy compounds such as triphenyl orthovanadate, vanadium dichloro ditolyloxide; diketone compounds such as vanadium triacetylacetonate and vanadyl dibenzoylacetonate; ketoester compounds such as vanadyl triacetylacetate, and carboxylic compounds such as vanadyl dipropionate, vanadium trioctoate, vanadium trichlorodecanoate and the like. In addition to the above vanadium compounds, others can be used in which the substituent Z is a dibasic group attached to the vanadium through two oxygen atoms, for instance a glycol group such as ethylene glycol or a dicarboxylic group such as malonate, malate, adipate. These compounds can be represented by the above general formulae when the subscripts $p$ and $r$ are reduced by one. It is understood of course that the most useful vanadium compounds are those which are stable under the operating conditions. The organo-aluminum compounds whose use is preferred in conjunction with these vanadium compounds may be represented by the formula $AlR'_{3-n}X'_n$ where R' is a saturated alkyl or aryl hydrocarbon radical containing from 1 to 12 carbon atoms, X' is a halogen and $n$ has a value from 0 to 2. Thus the hydrocarbon radical may be methyl, n-butyl, isobutyl, hexyl, cyclohexyl, phenyl, benzyl and the like. The halogen may be chlorine, bromine or iodine. Mixtures of the various organo-aluminum compounds may be used and it is desirable for best yields of copolymer that at least one of them contain halogen. The preferred organo-aluminum compounds are dialkyl aluminum monochlorides and monoalkyl aluminum dichlorides such as monoethyl aluminum dichloride, mono-n-butyl aluminum dichloride, diisobutyl aluminum monochloride.

The polymerization process is carried out by continuously feeding the reactants to a reactor containing a rapidly agitated reaction mixture and continuously withdrawing product. In order to produce a homogeneous copolymer, it is necessary to maintain steady state conditions throughout the entire reaction mixture. In order to achieve such conditions, it is necessary that the addition of each reactant and the withdrawal of product must be at a constant rate. Furthermore, the product stream must be withdrawn from the reactor at the same rate as the feed enters it so that the volume of liquid in the reactor is constant. The most convenient method of achieving this is to use a reactor equipped with an overflow outlet at the desired level so that the product stream leaves the reactor at the same rate as that at which the feed enters. It is preferable that the reactor be filled or at least substantially filled with liquid although the advantages of the invention may be obtained with a partially filled reactor provided the volume of liquid in the reactor is constant. It is also essential in the practice of the invention to have thorough and rapid mixing in order that the reactants be uniformly distributed throughout the reaction mixture as soon after entering the reactor as possible.

In order to obtain best results, the polymerization is carried out using a reaction diluent consisting of a non-reactive organic liquid which is a solvent for the monomers being polymerized as well as for the copolymer product. It is advantageous if the liquid medium is also a solvent for the catalyst although it is not essential in the practice of the invention. Suitable organic liquids which may be used as the polymerization medium are the hydrocarbon solvents such as aromatic, alicyclic and aliphatic hydrocarbons and mixtures thereof as well as chlorinated aromatic, alicyclic and aliphatic hydrocarbons and mixtures thereof.

Examples of suitable diluents are butane, pentane, hexane, heptane, octane, nonane, decane, benzene, toluene, xylene, cyclohexane, methylcyclohexane, chlorobenzene, dichlorobenzene etc. In order to avoid the necessity for recovering large volumes of a non-reactive organic liquid it may be desirable in some cases for the monomers themselves to act as diluent.

The reaction components may be fed to the reactor in separate streams but it is preferable that as many of them as possible be premixed and fed as a single stream in order to insure rapid and complete mixing in the reaction mixture before appreciable polymerization takes place. The most satisfactory procedure is to feed to the reactor a stream containing one of the catalyst components and another stream containing the balance of the reactants. In this way the catalyst complex which is the effective copolymerization catalyst is formed in situ in the reaction mixture. The catalyst complex may be formed prior to introduction to the reaction mixture by mixing solutions of the two catalyst components either in the diluent used in the copolymerization reaction or in a liquid miscible with such diluent. This preformed catalyst should then be added to the reactor as a separate stream or to the feed stream containing the monomers at a point as close as possible to its entry to the reactor in order that the contact time of the catalyst complex with monomers outside the agitated reaction mixture may be kept to a minimum. When performed catalyst is utilized, it should be used within a relatively short period of time after formation. The rate of loss of activity depends on the particular catalyst system used and is readily experimentally determinable. For example, the catalyst formed from tributyl vanadate in heptane should be used within about 24 hours of formation.

The minimum amount of catalyst which is required to effect polymerization is a function of the conditions of polymerization. For example, it depends on the temperature and pressure at which the copolymerization is carried out, on the particular monomers which are copolymerized and on the amount and type of impurities present. The amount required under any particular circumstances is determinable by experimentation and may be about one millimole per mole of total monomers in the feed or it may be five millimoles or higher of catalyst per mole of total monomers in the feed. In practicing the continuous process of the present invention, it is important that the catalyst concentration be carefully controlled and that the total catalyst concentration (transition metal compound plus organo-metallic compound) be selected along with feed ratio and residence time in order to produce a copolymer having a desired comonomer composition. The amount used may vary from the minimum concentration which will effect copolymerization to a large excess if it is desired to operate at a low residence time or at a high feed ratio for reasons explained later. The total catalyst concentration which may be used may therefore vary anywhere from about 0.1 millimole to about 30 millimoles or more per mole of total monomers. The more ratio of the organometallic reducing agent to the transition metal compound which may be used depends on the particular compounds involved but in general there should be at least sufficient of the organometallic compound to complex all of the transition metal compound. When the catalyst complex is formed by mixing an aluminum compound and a vanadium compound the ratio should be greater than 1/1 on a molar basis and a suitable operating range is between about 1/1 and 12/1 although higher ratios for example up to 25/1 may be required especially if the amount of impurities such as water tends to be high. The optimum ratio falls in the range between about 3/1 and 8/1 on a molar basis for catalysts that have a high proportion of halogen atoms and between about 3/1 and 12/1 for catalysts having a low proportion of halogen atom. When the catalyst is formed from compounds of other metals, the operable ratios may be different but can be determined by simple experimentation. For example, when the organometallic compound is a compound of a metal of Group I or II the ratio of such compound to the transition metal compound should generally be below 6/1 and in some cases for instance when using lithium alkyl should be below 4/1.

The copolymerization may be carried out over a wide temperature range varying generally from about —25° C. to 125° C. The preferred range is from about 0° C. to 80° C. The reaction may be carried out over a wide range of pressures and there is an interrelationship between temperature and pressure. Obviously, the monomers must be dissolved in the reaction medium and as the temperature is increased, higher pressures are required to maintain a suitable concentration of the monomers in the reaction mixture. It is advantageous to operate near atmospheric pressure to avoid the use of high pressure equipment, but in the practice of the invention it is desirable to operate at a pressure somewhat above atmospheric in order to have sufficient ethylene in solution in the reaction medium. A pressure above about 3 atmospheres is used and preferred operation is at a pressure above about 6 atmospheres. There is no critical upper pressure limit as far as practicing the present invention is concerned but to avoid the disadvantages of using very high pressure equipment, it is desirable to operate at a pressure below about 50 atmospheres and preferably below 30 atmospheres.

As discussed heretofore, the prior art processes for the copolymerization of ethylene and a 1-olefin such as propylene which have been used in attempts to produce copolymers which are homogeneous with regard to comonomer composition involve using a batch process in which an effort is made to maintain the relative proportions of the comonomers in the reaction mixture at a constant value. These processes involve adding ethylene and 1-olefin in the same ratio as that of the copolymer produced. The inventors have now succeeded in developing a fully continuous process which results in an improved copolymer. This continuous process has the additional advantage that any of a range of feed ratios may be used to produce copolymers having a particular ethylene content. These advantages may be achieved while operating to a relatively high conversion of monomers. In practicing the continuous process of the present invention under steady state conditions, the composition of the copolymer product has been found to be a function of feed ratio, residence time, and total catalyst concentration. This relationship may be represented by the equation $$E_P = f\left(\frac{E_F}{CT}\right)$$

where $E_P$ is the mole percent ethylene in the copolymer product, $E_F$ is the mole percent ethylene of the total monomers in the feed, T is the residence time in the reactor, and C is the total catalyst concentration. Residence time in a measure of the average time in the reactor of all the components and is determined by dividing the volume of the reaction mixture by the rate at which feed enters the reaction mixture. If the feed ratio (mole ratio of ethylene to 1-olefin in the feed) is increased at a given catalyst concentration, it is necessary to operate at a longer residence time in order to maintain the ethylene content of the product at a fixed value. Conversely, if the feed ratio is decreased at a given catalyst concentration, it is necessary to operate at a shorter residence time in order to maintain the ethylene content of the product. Similarly if the residence time is increased at a given catalyst concentration or if the catalyst concentration is increased at a given residence time, the feed ratio must be increased and if the residence time is decreased at a given catalyst concentration or if the catalyst concentration is decreased at a given residence time, the feed ratio must be decreased in order to maintain the ethylene content of the product. Since steady state conditions are necessary for the production of homogeneous copolymers, a change in feed ratio, residence time or catalyst concentration will result in non-homogeneous product until steady state conditions have been re-established. The time required to establish such conditions depends on the physical characteristics of the reactor, the degree of agitation, feed rate, etc. and may be determined by experimentation.

In practicing the invention, if it is desired to operate at a given residence time, and a given total catalyst concentration, a trial run may be made to determine the feed ratio required to produce a given copolymer. Or, if it is desired to use a given feed ratio at a particular catalyst concentration, a run may be made to determine the residence time necessary to produce the desired copolymer. In this way one may select the feed ratio and residence time which result in a copolymer product having the desired ethylene content. Or, if it is desired to use a given feed ratio and a particular residence time, experiments may be run to determine the catalyst concentration necessary to produce copolymer of the desired composition. The residence time is conveniently changed by changing the rate at which the feed is pumped to the reaction mixture provided the feed stream enters at the same rate as the product stream is withdrawn. This is readily accomplished in a system in which the product is removed through an overflow which maintains a constant liquid level in the reactor.

One of the advantages of the invention is that the feed ratio of ethylene to the copolymerizable olefin may be varied over wide limits. For example, in the production of copolymers containing from 10 to 90% ethylene units the ratio may fall between 9/1 and 1/100, the actual ratio chosen being determined by the composition of the copolymer which it is desired to produce. In the production of amorphous ethylene-propylene copolymers having an ethylene content between 40 and 75 mole percent, the ratio of ethylene to propylene in the feed is chosen from the range between 3/1 and 1/50, with the preferred ratios falling between 2/1 and 1/8. The feed ratios within these ranges will not all produce the desired copolymers under the various polymerization conditions of catalyst type and concentration, and residence time, but for all ratios within these ranges it is considered that there are conditions at which homogeneous copolymers may be produced according to the invention. For example, using $VOCl_3$ and aluminum diethyl monochloride, the feed ratio is between 1/1 to 1/18 to produce a copolymer having 50 mole percent ethylene units, and between 3/1 to 1/6 to produce a copolymer having 75 mole percent ethylene units. On the other hand, using tri (n-butyl) orthovanadate and aluminum ethyl dichloride, the ratio is between 1/1 and 1/26 for the production of a copolymer having 50 mole percent ethylene units and between 1/3 and 1/78 for a copolymer having 25 mole percent ethylene units. Another advantage of the invention is that a very wide range of residence times may be used. Short times may be used to achieve some of the advantages of the invention but it is generally desirable to use a residence time of at least 10 minutes. There is no critical upper limit although times in excess of about 5 hours are not economical for the production of most copolymers. The preferred range of residence time is from 20 to 120 minutes. Since the production of the homogeneous copolymers of the invention depends on rapid and thorough mixing in the reaction zone, it is essential that the viscosity of the reaction mixture be low enough to permit such mixing. It should be below 100 poise and preferably below 20 poise. The viscosity is determined by the copolymer concentration (herein also termed solids level), by the molecular weight of the copolymer, and by the particular reaction diluent used. For example, in producing a copolymer of ethylene and propylene in the Mooney (ML-4) range of about 30–60 using hexane as the reaction diluent, it is desirable to operate at a solids level below about 15%. A higher Mooney viscosity product would have a higher molecular weight and it would be desirable to operate at a lower solids level. The solids level is most conveniently adjusted by the total monomer concentration in the feed stream and the monomer concentration does not affect significantly the homogeneous nature or the ethylene content of copolymers produced according to this invention. In this system, the conversion increases with an increase in residence time and catalyst concentration and therefore when it is desirable to operate under such conditions it is necessary to use a lower monomer concentration than that used under conditions which result in lower conversions. For example, in the production of the ethylene-propylene copolymer mentioned above, a monomer concentration of the order of 50% of the total feed stream may be used at 15 minutes residence time whereas a concentration of about 25% should be used at 60 minutes residence time.

Having described the invention in general terms, it is further illustrated by the following examples which show the copolymerization of ethylene with propylene and butene-1 according to the present invention, as well as by the prior batch process for comparison purposes.

The copolymerization experiments were carried out in the presence of hexane as diluent. Two grades of hexane were used with equal success: One with a purity of 85% and the other with a purity of 45%. The non-hexane components consisted mainly of saturated aliphatic and cycloaliphatic hydrocarbons containing 5 to 7 carbon atoms and boiling at temperatures near the boiling temperature of hexane, with less than 1 mole percent of unsaturated and aromatic hydrocarbons. The diluent was dried by prolonged recirculation through a bed of activated alumina.

The copolymers were analyzed for bound ethylene content (composition), amount of crystallinity and their solubility characteristics were examined. The composition was determined using an infra-red spectrophotometer. The ratio of absorbances at the 7.25 micron and the 6.83 micron bands was used as a measure of the propylene content in the copolymer. The amount of crystallinity was determined by X-ray diffraction measurements. A sharp peak is observed at the 2θ angle of 21.4° when crystalline polyethylene is present. The ratio of the intensity of this peak to the total scattering intensity was taken as a measure of the crystalline content of the copolymer.

Very small amounts of crystallinity were detected by inspecting films of copolymer under a polarizing microscope consisting of an analyzer at 90° to the polarizer, a first order red compensator at 45° to the analyzer, and a rotatable stage. When crystals were present in the copolymer film, the colour changed from red to blue and then to orange as the stage was rotated. Such copolymer was considered to be anisotropic and birefringent. It was considered that when the test showed a uniform red colour with no change in colour as the stage was rotated, no crystals were present, i.e. the birefringence test was negative. The test was very sensitive (even small amounts of antioxidant could give a positive birefringence test) but only qualitative.

The solubility of the copolymers was determined in pentane at 20° C. and in heptane at −15° C. by dissolving up to 1 gram of copolymer in 100 mls. of solvent under mild agitation for about 16 hours, filtering the solution and evaporating an aliquot to dryness.

Power loss determinations were carried out on vulcanized copolymers using the Dunlop Rotary Power Loss Machine. The samples for this test were compounded on a 10″ x 20″ laboratory mill using the following recipe in parts by weight:

| | |
|---|---|
| Copolymer | 100 |
| High abrasion furnace carbon black | 50 |
| Dicumyl peroxide | 3.0 |
| Sulphur | 0.3 | moulded in the form of a solid annulus of 102 mm. O.D., 64 mm. I.D., and 19 mm. thick to a metal disc of 64 mm. O.D., and vulcanized for 40 minutes unless otherwise indicated, at 154° C. in a press mould. The small 102 mm. wheel, so formed, was mounted on a free running shaft carried on a lever system of the machine and rotated at a constant speed of 5.5 revolutions per second by a 102 mm. O.D. steel drum which in turn, was driven by a synchronous motor. A load of 9.1 kg. was applied to the wheel by a weight suspended at the end of the lever system and the deflection was indicated on a dial gauge placed on the lever system at an equal distance from the pivot and from the centre of the metal disc on which the sample was mounted. When a part of the energy used in deforming was absorbed in the sample, the reaction torque on the motor caused the stator to swing to a position such that the additional motor torque was balanced by the gravitational torque of the displaced mass of the stator. The energy loss was determined by the position of a pointer attached to the stator and moving over a fixed scale calibrated in joules per revolution. The sample was surrounded by an oven so that its temperature could be raised above room temperature, to about 125° C. The temperature was measured by a thermocouple threaded through the sample, the leads of which were brought out to rotating point contacts at either end of the shaft and then to a potentiometer for continuous measurement. The sample was first cooled to −50° C. by packing in Dry Ice and readings taken as the sample warmed up, at intervals of approximately 5° C. The rate of rise of temperature was controlled between 1° C. and 2° C. per minute by a variable transformer. For each measurement, readings were taken of power loss in joules/revolution, deflection in millimeters, and temperature in °C. The power loss of rubbery ethylene-propylene copolymer expressed in joules/revolution, reaches a maximum at a temperature of about −20° C., then falls as the temperature is increased and finally levels off at temperatures between 20 and 100° C. If crystals are present in the copolymer, a second maximum in the form of a broad peak is encountered at temperatures between 50° C. and 70° C.

The crystallizability of copolymers under strain was measured on gum specimens which were compounded on the laboratory mill with 3.0 parts of dicumyl peroxide and 0.3 part of sulphur per 100 parts of copolymer, and cured for 50 minutes in a press at 154° C. The vulcanizate was heated to 120° C., stretched to 20% elongation and the stress i.e. the force in p.s.i. required to maintain 20% elongation, measured at one minute intervals as the specimen was cooled to −40° C., at the rate of 3° C. per minute. A graph was then plotted of stress (p.s.i.) against temperature (° C.). In this test, a straight line relationship is obtained in the temperature range over which a particular copolymer behaves as an ideal elastomer and when extrapolated to lower temperatures permits the determination by interpolation of the stress which that particular copolymer would have if it remained amorphous at such temperatures. An ideal elastomer, tested under these conditions, exhibits a linear decrease in stress over a wide temperature range as temperature is lowered. When crystallization occurs during cooling, a downward deflection from the linearity of the stress vs. temperature relationship is observed. The temperature at which ethylene-propylene copolymers cease to behave as ideal elastomers ranges from about 25° C. to about 95° C., depending on many, as yet uninvestigated factors. The magnitude of the deflection from linearity of the stress-temperature relationship, however, has been found to be a sensitive measure of crystallizability under stress for amorphous polymers. The crystallizability of the copolymer at 20% elongation is herein defined as the percent difference in the stress at 20% elongation from that expected of the amorphous non-crystallizable copolymer and determined by extrapolation of the linear stress-temperature relationship. The term "substantially non-crystallizable" is used herein to describe copolymers in which the crystallizability is 5% or less. The crystallizability of ethylene-propylene copolymer is considered to be an indirect method of estimating the average length of polyethylene blocks in the copolymer and a measure of randomness of ethylene distribution.

The elastic properties of some of the copolymers were determined by curing balls of one inch diameter in a mould for 50 minutes at 154° C. using a compound prepared on a laboratory mill with 3.0 parts of dicumyl peroxide and 0.3 part of sulphur per 100 parts of copolymer. The rebound of the balls was determined by dropping them on a steel plate from a height of four feet and measuring the height of the bounce. Rebound is expressed as a percentage of the height of the drop. In this test gum stocks of natural rubber show a rebound between about 69 and 77%.

EXAMPLE 1

Ethylene and propylene were copolymerized in a continuous process using as the reactor a stainless steel pressure vessel having a volume of about 3900 mls. and equipped with a twin turbine type agitator operating at 1200 r.p.m. and 2 baffles. The reactor was jacketed, and also provided with an inner coil, through which cold water was circulated.

The following solutions of the polymerization reactants were prepared in separate pressure vessels, called also charge vessels:

(1) A solution of ethylene in hexane maintained at a temperature of 22° C. and a pressure of 9.3 kg./cm.$^2$, corresponding to a concentration of 47.2 grams per liter of ethylene, (2) Liquid propylene of 99.0% purity, (3) A solution of VOCl₃ in hexane containing 2.6 grams VOCl₃ per liter, (4) A solution of aluminum diethyl monochloride in hexane containing 5.5 grams AlEt₂Cl per liter, (5) A solution of hydrogen in hexane containing 0.17 gram hydrogen per liter.

The reactor was thoroughly flushed and filled with dry hexane and maintained under a pressure of 25.6 kg./cm.² Then metering pumps connected to each of the charge vessels, were started and the solutions pumped at a constant rate in to the bottom of the reactor. The solution of ethylene was fed at the rate of 37.0 mls./minute; liquid propylene was fed at the rate of 15.7 mls./minute; the solution of aluminum diethyl monochloride and the solution of hydrogen were fed, each at the rate of 4.0 mls./minute. The hydrogen was used for the purpose of regulating the molecular weight of the copolymer product. These feed streams were fed into a single line, where they were mixed in two "in-line" mixers and then the mixture entered the reactor near the bottom. The solution of VOCl₃ was fed at the rate of 4.0 mls./minute through a separate line to the bottom of the reactor.

The discharge line was located at the top of the reactor so that the reactor was operated completely filled with liquid phase. Vapourization of ethylene and propylene was prevented by maintaining in the reactor a hydrostatic pressure of 25.6 kg./cm.² by means of a relief valve on the discharge line. The product stream flowed from the reactor at the rate of 64.7 mls./minute, i.e. at the same rate at which the feed stream was pumped into the reactor.

There was no reaction in about the first 30 minutes of pumping. As the concentration of catalyst reached a minimum threshold level, the polymerization reaction was initiated and the temperature gradually rose and the solids content in the product stream gradually increased until a level of 9.1% was reached in 3 hours. During this period the copolymer product was heterogeneous with its composition varying with time. At first, a partially crystalline relatively insoluble polymer was produced which was rich in ethylene (above 80 mole percent). Crystallinity and ethylene content gradually decreased as the solids increased. The system reached a steady state condition at 60° C. in 3 hours after which the yield, the composition, and physical properties remained constant. Therefore steady state conditions prevailed after 3 residence times. The residence time (volume of reactor/rate of entry of feed) was 60 minutes and the feed ratio of ethylene to propylene was 1/3 (mole/mole).

The copolymer product was isolated and recovered after steady state conditions were reached. The product stream containing copolymer dissolved in hexane flowed into a recovery vessel containing an excess of ethanol which caused precipitation of the copolymer. The copolymer was then refluxed twice with methanol and dried by milling on a laboratory mill at 115° C. The conversion at the steady state condition was calculated from the weight of monomers fed and the weight of polymer recovered in the same period of time and was found to be 36.2%. The copolymer contained 53 mole percent ethylene and showed a crystallinity of 0.2% (by X-ray measurement) and was 74% soluble in pentane at room temperature. The Mooney viscosity measured with the large rotor at 100° C. and 4 minutes (ML-4) was 49.

The presence of crystallinity in the polymer was also shown by optical anisotropy (birefringence), by the appearance of a second peak in the power loss curve, which was 0.28 joule/revolution above the minimum at 20° C. (2.14 joules/rev.), and by marked crystallizability under 20% elongation at room temperature in the stress-temperature determination. Analysis of the fractions obtained by elution fractionation of the copolymer showed a spread in ethylene content ranging from 40 to 66 mole percent.

EXAMPLE 2

The polymerizations of Example 1 were repeated using feeds containing various proportions of ethylene and propylene and various residence times and operation under steady state conditions as in Example 1. To maintain the solids level in the reaction mixture between about 7 and 9%, suitable variations were also made in the monomer concentration of the feed. The polymerization conditions used and the analyses of the products are shown in Table I.

Table I

| Run No. | 1 | 2 | 3 | 4 | 5 | 6 | 7 | 8 | 9 | 10 |
|---|---|---|---|---|---|---|---|---|---|---|
| Residence Time (min.) | 15 | 15 | 30 | 30 | 45 | 45 | 60 | 60 | 60 | 75 |
| Feed Ratio E/P (mole/mole) | 1/4.9 | 1/4 | 1/3.6 | 1/3 | 1/3.1 | 1/2.5 | 1/4 | 1/2.5 | 1/2 | 1/2.1 |
| Monomer Concn. (percent by Wt.) | 50 | 45 | 40 | 35 | 33 | 30 | 25 | 25 | 25 | 20 |
| Ethylene-Hexane Soln.: | | | | | | | | | | |
| Concn. (g./l.) | 81.6 | 76.3 | 72.3 | 75.5 | 62.3 | 69.8 | 38.6 | 51.3 | 63.2 | 50.0 |
| Feed Rate (ml./min.) | 107.8 | 125.7 | 58.8 | 64.1 | 46.2 | 48.0 | 36.3 | 38.2 | 38.2 | 32.0 |
| Liquid Propylene: Feed Rate (ml./min.) | 129.2 | 111.3 | 50.2 | 42.9 | 26.5 | 24.7 | 16.4 | 14.5 | 14.4 | 9.4 |
| Vanadium Catalyst Soln.: | | | | | | | | | | |
| Concn. (g./l.) | 5.2 | 5.2 | 2.6 | 2.6 | 2.6 | 2.6 | 2.6 | 2.6 | 2.6 | 2.6 |
| Feed Rate (ml./min.) | 8.0 | 8.0 | 8.0 | 8.0 | 5.3 | 5.3 | 4.0 | 4.0 | 4.0 | 3.2 |
| Aluminum Catalyst Soln.: | | | | | | | | | | |
| Concn. (g./l.) | 11.0 | 11.0 | 5.5 | 5.5 | 5.5 | 5.5 | 5.5 | 5.5 | 5.5 | 5.5 |
| Feed Rate (ml./min.) | 8.0 | 8.0 | 8.0 | 8 | 5.3 | 5.3 | 4.0 | 4.0 | 4.0 | 3.2 |
| Hydrogen Solution: | | | | | | | | | | |
| Concn. (g./l.) | 0.17 | 0.17 | 0.17 | 0.17 | 0.17 | 0.17 | 0.17 | 0.17 | 0.17 | 0.17 |
| Feed Rate (ml./min.) | 6.0 | 6.0 | 4.0 | 6.0 | 4.0 | 4.0 | 4.0 | 4.0 | 4.0 | 4.0 |
| Reaction Temperature (° C.) | 71 | 79 | 71 | 79 | 78 | 75 | 35 | 74 | 73 | 78 |
| Conversion (percent) | 13.7 | 16.0 | 18.1 | 22.5 | 27.5 | 26.0 | 35 | 32.3 | 28.5 | 33.3 |
| Solids (percent) | 6.8 | 7.2 | 7.2 | 6.8 | 9.0 | 7.8 | 8.8 | 8.1 | 7.1 | 6.7 |
| Copolymer Properties: | | | | | | | | | | |
| Composition (mole percent ethylene) | 56 | 62 | 58 | 62 | 52 | 62 | 40 | 57 | 62 | 75 |
| Crystallinity (percent) | 0.2 | 1.0 | 0.4 | 1.0 | 0.4 | 1.0 | 0 | 0.4 | 1.0 | 0.3 |
| Mooney Viscosity (ML-4 at 100° C.) | 43 | 45 | 45 | 45 | 41 | 40 | 34 | 42 | 36 | 42 |

These results show that there is a fixed relationship between the Feed Ratio (E/P), the Residence Time and the comonomer composition of the product at constant total catalyst concentration. For example, at a residence time of 15 minutes, a feed ratio of 1/4.9 is required to produce a copolymer containing 56% ethylene under steady state conditions. On the other hand when the feed ratio is 1/2.5, a residence time of 60 minutes is required to produce a copolymer having the same composition under steady state conditions. It is also seen by comparing Runs 5 and 6 at a given residence time of 45 minutes, that a change in the feed ratio from 1/3.1 to 1/2.5 results in a copolymer having 62% bound ethylene as compared to 52% bound ethylene. And by comparing Runs 6 and 8, it is seen that at a feed ratio of 1/2.5 the product produced at 45 minutes residence time has a bound ethylene content of 62% whereas that produced at 60 minutes residence time has a bound ethylene content of 57%. In other words at a given feed ratio the bound ethylene content of the product decreases with an increase in residence time.

The total catalyst concentration in all of these runs was maintained constant at 0.50 gram per liter. A plot of the Feed Ratio against Residence Time is shown in FIGURE 1 from which it is seen that there is a straight line relationship between Feed Ratio and Residence Time for a particular comonomer composition. Thus line A shows the relationship for copolymers containing 62% bound ethylene. Line B shows the relationship for copolymers containing from 56 to 58% bound ethylene. And broken line C indicates the approximate position for copolymers containing 40% bound ethylene. Thus it is seen from FIGURE 1 that there is a family of straight lines relating Feed Ratio and Residence Time and that in order to produce a copolymer having a specific comonomer composition, it is necessary to deliberately select the Feed Ratio and Residence Time in relation to each other.

EXAMPLE 3

Ethylene and propylene were copolymerized as in Example 1 except that aluminum ethyl dichloride and tri-(n-butyl) vanadate $(VO(OC_4H_9)_3)$ were used instead of aluminum diethyl chloride and vanadium oxytrichloride, respectively.

The details of the polymerization conditions and the properties of the copolymers produced are shown in Table II.

C. under 20% elongation. The Rebound of gum stocks at 20° C. determined according to the method described hereinbefore was found to be 67% and 73% for the copolymers of Runs 1 and 2, respectively, about the same as natural rubber which was found to have a Rebound in the same test ranging from 69–77.

Power Loss measurements were not determined on the copolymer produced in Run 4 but on Run 3 such measurements showed that in spite of the fact that the ethylene content was 70%, the Power Loss was very low and there was only the vestige of a second peak at a temperature of about 60° C. Analysis of the fractions obtained by elution fractionation of the copolymers produced in Runs 3 and 4 showed that for Run 3 (residence time—60 minutes) the composition of the fractions varied from 68–72 mole percent ethylene and for Run 4 (residence time—15 minutes) varied from 55 to 75 mole percent ethylene thus illustrating clearly that more homogeneous products are produced at longer residence times.

The total catalyst concentration used throughout the runs of this example was 0.55 gram per liter. Curve D of FIGURE 1 shows the relationship between Feed Ratio and Residence Time at this catalyst level for the copolymers produced in Runs 3 and 4 of this example.

EXAMPLE 4

Ethylene and propylene were copolymerized using the same catalyst as in Example 3 and a third comonomer, dicyclopentadiene, present in a small amount was also copolymerized. The amount of dicyclopentadiene in the feed stream was one mole per 100 moles of total

*Table II*

| Run No | 1 | 2 | 3 | 4 |
| --- | --- | --- | --- | --- |
| Feed Ratio E/P (mole/mole) | 1/4 | 1/2.8 | 1/1.3 | 1/2.2 |
| Monomer Concentration (percent by Wt.) | 33 | 25 | 20 | 40 |
| Residence Time (min.) | 60 | 60 | 60 | 15 |
| Ethylene hexane Soln.: | | | | |
| Concn. (g./l.) | 57.2 | 52.4 | 62.6 | 99.4 |
| Feed Rate (mls./min.) | 31.5 | 37.0 | 42.5 | 142.7 |
| Liquid Propylene: Feed Rate (mls./min.) | 21.3 | 15.7 | 10.0 | 94.3 |
| VO(O$_n$Bu)$_3$ Solution: | | | | |
| Concn. (g./l.) | 1.9 | 0.9 | 1.9 | 3.8 |
| Feed Rate (mls./min.) | 4.0 | 8.0 | 4.0 | 8.0 |
| AlEtCl$_2$ Solution: | | | | |
| Concn. (g./l.) | 7.0 | 7.0 | 7.0 | 14.0 |
| Feed Rate (mls./min.) | 4.0 | 4.0 | 4.0 | 8.0 |
| Hydrogen Solution: | | | | |
| Concn. (g./l.) | 0.17 | 0.09 | 0.09 | 0.17 |
| Feed Rate (mls./min.) | 4.0 | 4.0 | 4.0 | 6.0 |
| Reaction Temperature (° C.) | 30 | 32 | 54 | 55 |
| Conversion (percent) | 29.1 | 37.4 | 47.7 | 19.5 |
| Solids (percent) | 9.7 | 9.4 | 9.5 | 7.8 |
| Copolymer Properties: | | | | |
| Composition (mole percent ethylene) | 49 | 56 | 70 | 70 |
| Crystallinity (percent) | 0 | 0 | 0 | 0 |
| Mooney Viscosity (ML-4 at 100° C.) | 30 | 30 | 45 | 38 |
| Solubility in pentene at 20° C. (percent) | 100 | 100 | 100 | 100 |
| Solubility in heptane at −15° C. (percent) | 100 | 100 | 90 | 85 |
| Birefringence test | Negative | Negative | Negative | Positive |

The copolymers produced in Runs 1 and 2 showed low Power Loss and no evidence of crystallinity in Power Loss measurements. In Stress-Temperature measurements they showed no crystallinity at 0° C. under 20% elongation and less than about 10% crystallinity at −20° ethylene plus propylene. The polymerizations were carried out under steady state conditions at a residence time of 60 minutes. The details of the polymerization conditions and the properties of the copolymers produced are shown in Table III.

Table III

| Run No | 1 | 2 |
|---|---|---|
| Feed Ratio (E/P mole/mole) | 1/3 | 1/1.5 |
| Monomer Concentration (percent by Wt.) | 33.3 | 25 |
| Ethylene-Hexane Solution: | | |
| Concn. (g./l.) | 75.9 | 75.2 |
| Feed Rate (mls./min.) | 29.1 | 39.5 |
| Liquid Propylene: Feed Rate (mls./min.) | 19.7 | 13.15 |
| VO(O$_n$Bu)$_3$ Solution: | | |
| Concentration (g./l.) | 1.9 | 3.8 |
| Feed Rate (mls./min.) | 4.0 | 4.0 |
| Aluminum Alkyl Compound: | | |
| Concentration (g./l.) | 7.0 | 14.0 |
| Feed Rate (mls./min.) | 4.0 | 4.0 |
| Hydrogen Solution: | | |
| Concentration (g./l.) | 0.21 | 0.17 |
| Feed Rate (mls./min.) | 4.0 | 4.0 |
| Dicyclopentadiene Solution: | | |
| Concentration (g./l.) | 113.2 | 87.6 |
| Feed Rate (mls./min.) | 4.0 | 4 |
| Reaction Temperature (° C.) | 41 | 46 |
| Conversion (percent) | 27.7 | 39 |
| Solids (percent) | 9.2 | 9.8 |
| Copolymer Properties: | | |
| Composition (mole percent ethylene) | 65 | 66 |
| Crystallinity (percent) | 0 | 0 |
| Mooney Viscosity (ML-4 at 100° C.) | 67 | 43 |
| Solubility in pentane at 20° C. (percent) | 100 | 100 |
| Solubility in heptane at −15° C. (percent) | 100 | 100 |
| Birefringence test | Negative | Negative |

The copolymers produced in both of these runs showed no crystallinity in X-ray measurements and were completely soluble in pentane at 20° C. and in heptane at −15° C. Furthermore, the birefringence test showed no indication of crystallinity. Rebound and Stress-Temperature measurements were not carried out on the copolymer produced in Run 2 but the copolymer produced in Run 1 showed a Rebound of 67% at 20° C. and only 5% crystallizability at 0° C. in the Stress-Temperature measurements. The power loss was determined and showed no second peak.

Figure 2:
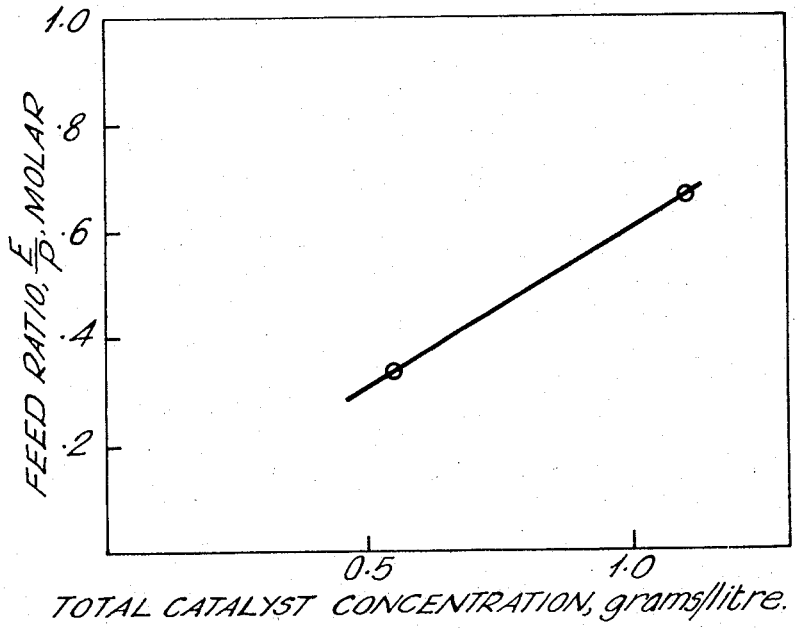

The total catalyst concentration in Run 1 was 0.55 gram per liter and in Run 2 was 1.10 grams per liter. FIGURE 2 shows a graph of Feed Ratio plotted against Catalyst Composition for the runs of this experiment. It is seen that a relationship exists between these two variables in producing a copolymer of a specific composition at a constant Residence Time and that the relationship is similar to that shown in FIGURE 1 between Feed Ratio and Residence Time at constant Catalyst Concentration.

EXAMPLE 5

The tensile properties were determined of five of the copolymers prepared in the previous examples. They were compounded on a micro scale mill according to the following recipe in parts by weight:

Copolymer _____ 100
High abrasion furnace carbon black _____ 50
Dicumyl peroxide _____ 3
Sulphur _____ 0.3

The compounds were cured in a press at 154° C. for 40 minutes and their stress-strain properties determined. The results of these tests are shown in Table IV.

Table IV

| Copolymer No | 1 | 2 | 3 | 4 | 5 |
|---|---|---|---|---|---|
| Copolymer Composition (mole percent ethylene) | 53 | 49 | 56 | 70 | 65 |
| Tensile Strength (kg./cm.$^2$) | 210 | 199 | 217 | 237 | 304 |
| Percent Elongation at break | 455 | 535 | 420 | 335 | 435 |
| 300% Modulus (kg./cm.$^2$) | 109 | 81.5 | 126 | 210 | 93 |

The copolymers tested were produced in the previous examples as follows: No. 1 in Example 1, Run 1; No. 2 in Example 3, Run 1; No. 3 in Example 3, Run 2; No. 4 in Example 3, Run 3; and No. 5 in Example 4, Run 1. The results show that the copolymers have tensile properties typical of excellent rubbers. It is noteworthy that copolymer No. 5 which contains a small proportion of dicyclopentadiene has a higher tensile strength than the simple copolymers of ethylene and propylene.

EXAMPLE 6

The copolymer produced in Example 4, Run No. 1, was compounded on a 10 inch x 20 inch laboratory mill according to the following recipe in parts by weight:

Copolymer _____ 100
High abrasion furnace carbon black _____ 50
Petroleum oil _____ 10
Sulphur _____ 1.5
Zinc oxide _____ 5.0
Stearic acid _____ 1.5
Tellurium diethyl dithiocarbamate _____ 2.0
Benzothiazyl disulphide _____ 1.0

The processing characteristics of the copolymer were good with the carbon black being incorporated without difficulty. Tensile sheets were cured in a mold at 154° C. for 20, 40 and 80 minutes and the stress-strain properties determined. The results are shown in Table V.

Table V

| Cure Time (min.) | 20 | 40 | 80 |
|---|---|---|---|
| Tensile Strength (kg./cm.$^2$) | 225 | 209 | 187 |
| Elongation at break (percent) | 390 | 290 | 240 |
| Modulus at 100% Elongation (kg./cm.$^2$) | 29.8 | 38.0 | 40.7 |
| Modulus at 300% Elongation (kg./cm.$^2$) | 156 | | |

The stress-strain properties shown in Table V are typical of a sulphur curable polymer and the values are of the same order as those for conventional rubbers such as butadiene-styrene rubber, butyl rubber and natural rubber. This copolymer can therefore be used in conventional rubber applications such as tires, industrial goods, wire coverings, etc. These data further show that the dicyclopentadiene copolymerized with the ethylene and propylene and that the small amount used is sufficient to provide a copolymer having enough unsaturation to render it vulcanizable using a conventional rubber compounding recipe.

The hysteresis properties of the copolymer were tested on a sample of the compound prepared as above and cured at 40 minutes, using a Goodrich-Flexometer according to the procedure of ASTM D-623-58, Method A, with an applied static load of 10 kg./cm.$^2$, a stroke length of 4.5 mm., and at an ambient temperature of 38° C. Using this procedure, the Heat Build-up, i.e. the maximum increase in temperature was found to be 27.2° C. The value is lower than that for the prior art copolymers of ethylene and propylene and is much lower than that of butadiene-styrene rubbers. In fact, it is approximately the same as the Heat Build-up for natural rubbers using the same test.

EXAMPLE 7

Ethylene and propylene were copolymerized according to the procedure described in Example 1. Five runs were carried out using feeds containing various proportions of ethylene, propylene and hexane, and a catalyst composed of ethyl aluminum dichloride and tri sec-butyl vanadate. The residence time in the reactor was maintained constant, at 60±2 minutes. The composition of feed streams used, the conditions of polymerization, and the analyses of the products obtained are presented in Table VI.

Table VI

| Run No | 1 | 2 | 3 | 4 | 5 |
|---|---|---|---|---|---|
| Feed Radio E/P (mole/mole) | 1/10.8 (0.09) | 1/4.9 (0.2) | 1/3.1 (0.32) | 1/1.3 (0.77) | 1/1.3 (0.77) |
| Ethylene-Hexane soln.: | | | | | |
| Concn. (g./l.) | 57.5 | 53.2 | 52.4 | 67.7 | 67.7 |
| Feed Rate (ml./min.) | 17.8 | 30.0 | 36.0 | 39.5 | 39.5 |
| Propylene: Feed Rate (ml./min.) | 34.7 | 23.5 | 15.6 | 10.1 | 9.9 |
| $Al(C_2H_5)Cl_2$ soln.: | | | | | |
| Concn. (g./l.) | 7.0 | 7.0 | 7.0 | 8.0 | 7.0 |
| Feed Rate (ml./min.) | 4.0 | 4.0 | 4.0 | 6.0 | 4.0 |
| $VO(OC_4H_9)_3$ soln.: | | | | | |
| Concn. (g./l.) | 1.9 | 1.6 | 1.6 | 1.5 | 1.6 |
| Feed Rate (mls./min.) | 4.0 | 4.0 | 4.0 | 4.0 | 4.0 |
| Hydrogen soln.: | | | | | |
| Concn. (g./l.) | 0.17 | 0.13 | 0.09 | 0.34 | 0.34 |
| Feed Rate (mls./min.) | 4.0 | 4.0 | 8.0 | 6.0 | 8.0 |
| Reaction Temperature (°C.) | 28 | 45 | 37 | 42 | 50 |
| Conversion (percent) | 12 | 22 | 18 | 38 | 48 |
| Solids (percent) | 6 | 7.5 | 4 | 7 | 9 |
| Composition of copolymer (mole percent ethylene) | 47 | 55 | 66 | 73 | 68 |
| Crystallinity (percent) | 0 | 0 | 0 | 0.3 | 0 |
| Mooney Viscosity (M/L4 at 100°C.) | Not tested | 28 | 54 | 28 | 26.5 |

The results indicate that amorphous and rubbery copolymers are produced with feed ratio of ethylene to propylene varying from 1/10.8 to 1/1.3. It is noted that conversions of 38 and 48 percent are obtained at the high ratio of 1/1.3 ethylene to propylene.

EXAMPLE 8

The copolymerization of ethylene and propylene was carried out according to the procedure of Example 1. The feed ratio of ethylene to propylene and the residence time of the feed in the reactor was maintained constant at 1/1.3 mole/mole and 60 minutes, respectively. Three runs were carried out using various concentrations of ethyl aluminum dichloride and tri butyl vanadate. Normal butyl vanadate was used in the first run, secondary butyl vanadate in the second run, and tertiary butyl vanadate was used in the third run. The composition of feed streams used and the properties of the copolymers produced at steady state conditions are presented in Table VII.

Table VII

| Run No | 1 | 2 | 3 |
|---|---|---|---|
| $VO(OC_4H_9)_3 + Al(C_2H_5)Cl_2$ concn. (mole/1×10⁻³) | 3.7 | 7.7 | 12.0 |
| Ethylene-Hexane: | | | |
| Concn. (g./l.) | 61.5 | 67.7 | 67.7 |
| Feed Rate (ml./min.) | 42.8 | 38.7 | 38.7 |
| Liquid Propylene: Feed Rate (ml./min.) | 10.0 | 10.2 | 9.9 |
| $Al(C_2H_5)Cl_2$ soln.: | | | |
| Concn. (g./l.) | 7.0 | 9.0 | 9.0 |
| Feed Rate (ml./min.) | 4.0 | 6.7 | 12.0 |
| $VO(OC_4H_9)_3$ soln.: | | | |
| Concn. (g./l.) | 1.6 | 1.5 | 1.6 |
| Feed Rate (mls./min.) | 4.0 | 4.5 | 8.0 |
| Hydrogen soln.: | | | |
| Concn. (g./l.) | 0.08 | 0.28 | 0.34 |
| Feed Rate (mls./min.) | 4.0 | 4.9 | 6.0 |
| Reaction Temperature (°C.) | 56 | 33 | (¹) |
| Conversion at steady state (percent) | 36 | 38 | 53 |
| Solids at steady state (percent) | 6.8 | 7.4 | 8.5 |
| Polymer composition (mole percent Ethylene) | 79 | 70 | 61 |
| Crystallinity (percent) | 0 | 0.5 | 0 |
| Mooney Viscosity (M/L4 at 100°C.) | 46.5 | 25 | 23 |
| Solubility in pentane at 20°C. (percent) | 72 | (²) | 100 |

¹ Not measured.
² Not tested.

EXAMPLE 9

The copolymerization of ethylene and propylene was carried out according to the procedure of Example 1 using an ethylene to propylene feed ratio of 1/20 mole/mole and a catalyst composed of ethyl aluminum dichloride and tributyl vanadate having a molar ratio of Al/V of 10/1. Ethylene and propylene were initially polymerized using a catalyst concentration of 2 millimoles/l. The experiment was run for 3 hours until steady state conditions were reached and an amount of the product sufficient for testing was recovered. Following this first stage of the run, the concentration of the catalyst was raised to 4 millimoles/l. Again, the polymerization was carried out for 3 hours to establish steady state conditions and then to collect the product. In the third stage of the run, the concentration of the catalyst was increased to 8 millimoles/l. The polymerization was continued for 3 hours in order to establish steady state conditions and then to collect the product produced at these conditions in a quantity sufficient for testing.

The composition and the feed rates as well as the properties of the three products separately collected are presented in Table VIII.

Table VIII

| Catalyst Concentration (moles/1×10⁻³) | 2 | 4 | 8 |
|---|---|---|---|
| Ethylene-Hexane Soln.: | | | |
| Conc. (g./l.) | 29.2 | 36.1 | 28.1 |
| Feed Rate (ml./min.) | 21.0 | 16.7 | 16.7 |
| Liquid Propylene: Feed Rate (ml./min.) | 36.2 | 36.2 | 28.0 |
| $Al(C_2H_5)Cl_2$ soln.: | | | |
| Conc. (g./l.) | 7.0 | 7.0 | 7.0 |
| Feed Rate (ml./min.) | 2.0 | 4.0 | 8.0 |
| $VO(O_n-C_4H_9)_3$ soln.: | | | |
| Conc. (g./l.) | 1.6 | 1.6 | 1.6 |
| Feed Rate (ml./min.) | 2.0 | 4.0 | 8.0 |
| Hydrogen soln.: | | | |
| Conc. (g./l.) | 0.17 | 0.17 | 0.17 |
| Feed Rate (ml./min.) | 4.0 | 4.0 | 4.0 |
| Reaction temperature (°C.) | 22 | 32 | 40 |
| Conversion (percent) | 7 | 8 | 13.5 |
| Solids (percent) | 3.5 | 4.0 | 5.0 |
| Polymer Properties: | | | |
| Composition (mole percent ethylene) | 41 | 35 | 27 |
| Crystallinity (percent) | 0 | 0 | 0 |
| Solubility in heptane at −15°C. | 100 | 100 | 100 |

The results of Examples 8 and 9 indicate that the composition of the copolymer depends on the concentration of the catalyst in the polymerization mixture. This dependence is further illustrated in FIGURE 3 for two E/P feed ratios, 1/1.3 used in Example 8, and 1/20 used in Example 9. A linear relationship is observed with the ethylene content in the copolymer decreasing as the concentration of the catalyst increases.

EXAMPLE 10

Ethylene and propylene were copolymerized according to the procedure of Example 1 in the presence of 1 mole percent, based on the sum of ethylene and propylene, of freshly distilled dicyclopentadiene.

The following solutions were metered into the reactor against a back pressure of 28 kg./cm.²

(i) Ethylene-hexane solution containing 82.1 g./l. ethylene at a rate of 32.9 mls./min., i.e. 2.7 g./min.;

(ii) Liquid propylene at a rate of 10.0 mls./min. (5.1 g./min.);

(iii) Dicyclopentadiene-hexane solution containing 75 mls./l. of dicyclopentadiene at a rate of 4.0 mls./minute;

(iv) VO(OsecC$_4$H$_9$)$_3$ solution containing 1.4 g./l. of VO(OsecC$_4$H$_9$)$_3$ at a rate of 4.0 mls./minute;

(v) Al(C$_2$H$_5$)Cl$_2$ solution containing 18.0 g./l. of AlC$_2$H$_5$Cl$_2$ at a rate of 6.0 mls./minute; and (vi) Hydrogen solution in hexane at a rate of 8.0 mls./minute.

The hydrogen content of solution (vi) was varied during the run between 0.085 and 0.34 g./l. in order to control the Mooney viscosity at a level of 50 to 60.

The polymerization reaction initiated in about 15 minutes of pumping. The solids content in the product stream gradually increased until a level of 10.4% was reached in 2 hours which corresponded to a conversion of 52%. Reaction temperature gradually rose from about 10° C. and levelled off at 47° C. in 2 hours of pumping. The reaction product produced under steady state conditions was introduced into a 1% solution of an antioxidant in methanol which caused precipitation of the polymer. The copolymer, separated from the liquid in which it was suspended, was refluxed with methanol and dried on a laboratory mill at 115° C.

The resulting polymer was tough and rubbery, and showed no X-ray crystallinity, and had a Mooney viscosity of 54.5. The apparent propylene content of this polymer determined by the infra red method was 33 mole percent or 42 percent by weight. The dicyclopentadiene content was determined using an iodometric method. For that purpose, a purified sample of the copolymer was dissolved in carbon tetrachloride, treated for one half hour at room temperature with an excess of iodine solution in the presence of mercuric acetate and trichloroacetic acid. The excess of iodine that was not consumed in the reaction with the unsaturated polymer sample was then titrated with an thiosulfate solution. The analysis was based on two premises: that for each molecule of dicyclopentadiene copolymerized with ethylene and propylene one carbon to carbon double bond was introduced in the copolymer; and that two iodine atoms were required to saturate one double bond. The dicyclopentadiene content of the polymer calculated in this way was 1.7 mole percent or 6.5 weight percent considering that the molecular weight of dicyclopentadiene was 3.8 times that of the average monomer unit in the copolymer containing 42 weight percent of propylene. The balance of the polymer was taken as made up of ethylene units. Thus, the weight percent of bound ethylene was 100−(42+6.5)=51.5. The composition of the copolymer was then recalculated on a molar basis and found to be 64.5 mole percent ethylene, 33.8 mole percent propylene, and 1.7 mole percent dicyclopentadiene.

The copolymer was compounded on a laboratory mill with 50 parts of HAF carbon black, 3 parts of dicumyl peroxide, and 0.3 part sulfur, all parts based on 100 parts of the copolymer, and then cured in a press at 154° C. for 60 minutes. The cured compound showed a tensile strength of 241 kg./cm.$^2$ an elongation of 315% and a 300% modulus of 231 kg./cm.$^2$. The power loss at 20° C. was 2.23 joules per revolution. The rebound of a gum compound cured under the same conditions as the black reinforced compound was 64.1% at 20° C. A minimum rebound of 7.7% was observed at −30° C.

EXAMPLE 11

Ethylene and butene-1 were copolymerized in a continuous process using the procedure of Example 1.

The following solutions were metered separately into the reactor:

(i) Ethylene-hexane solution containing 38.8 g./l. ethylene at a rate of 32.0 mls./minute;

(ii) Liquid butene-1 at a rate of 21.0 mls./minute;

(iii) Ethyl aluminum dichloride solution containing 7 g./l. Al(C$_2$H$_5$)Cl$_2$ at a rate of 6.0 mls./minute; and (iv) Tri n-butyl vanadate solution containing 1.6 g./l. VO(O$_n$C$_4$H$_9$)$_3$ at a rate of 6.0 mls./minute.

The temperature in the reactor slowly increased from 6° C. to 20° C. within two hours of metering the feed components. The solution discharged from the reactor contained 1.5% solids which corresponded to a conversion of 4.5%. The copolymer showing a Mooney viscosity of 31, was rubbery and contained 79 mole percent of bound ethylene.

In a second stage, the feed rate of each catalyst component was increased to 8.0 mls./minute. In order to maintain the residence time, at 60 minutes, the ethylene content in solution (i) was increased to 44.5 g./l. and the feed rate reduced to 28.2 mls./minute. In three hours following the change, the temperature rose to 26° C. and the conversion increased to 9.5%. The copolymer contained 68 mole percent of ethylene. The ethylene content of the above two copolymers was determined using an infra red spectrophotometer. The ratio of absorbances at the 13.9 micron and the 13.0 micron bands was used as a measure of the ethylene content in the copolymer.

We claim:

1. The continuous process of copolymerizing ethylene and a linear 1-olefin having the formula CH$_2$=CHR wherein R is a saturated alkyl hydrocarbon radical having from 1 to 10 carbon atoms to produce an amorphous homogeneous copolymer having a specific comonomer composition within the range between 30 to 80 mole percent of ethylene, which process comprises (a) continuously feeding to a reaction zone containing a rapidly agitated liquid reaction mixture having turbulent randomly directed flow, a feed comprising a non-reactive organic liquid, ethylene, said 1-olefin and a hydrocarbon soluble catalyst, the mole ratio of ethylene to said 1-olefin in said feed stream being constant and in the range between 3/1 and 1/50, said catalyst being formed by mixing a compound of vanadium with an organo-aluminum compound and maintained in the reactor at a total catalyst concentration in the range between 0.1 and 30 millimoles per mole of total monomers and (b) continuously withdrawing from said reaction zone a liquid product stream containing copolymer dissolved in said organic liquid, the rate of addition of said organic liquid, ethylene, said 1-olefin and said catalyst being constant, the rate at which said feed enters said reaction zone being constant and equal to the rate at which said product stream is withdrawn from said reaction zone whereby to maintain a constant volume of liquid in said reaction zone, thereby establishing a constant residence time from 20 to 120 minutes.

2. The process according to claim 1 wherein said soluble catalyst is formed by mixing a vanadium compound selected from the group represented by the formula VOZ$_{p-n}$X$_n$ and VZ$_{4-m}$X$_m$ with a compound having the formula AlR'$_{3-n'}$X'$_{n'}$ where Z is an organic group attached to the vanadium through an oxygen atom, contains 1–20 carbon atoms and is selected from the group consisting of alkoxides, aryloxides, diketones, ketoesters and carboxyl groups, X is a halogen atom, $p$ is 2–3, $n$ is 0–3 and is not greater than $p$, $r$ is 3–4 and $m$ is 0–4 and is not greater than $r$, R' is a hydrocarbon radical having 1–12 carbon atoms, X' is selected from the group consisting of chlorine and bromine, and $n'$ is 1–2.

3. The process according to claim 2 wherein the residence time is about 60 minutes.

4. The process according to claim 2 wherein said 1-olefin is propylene.

5. The process according to claim 2 wherein said 1-olefin is 1-butene.

6. The process according to claim 2 wherein said copolymer is a copolymer of ethylene, said linear 1-olefin and a minor proportion of a diolefin.

7. The process according to claim 6 wherein the molar ratio of ethylene to 1-olefin in the feed stream is between 2/1 and 1/8.

8. The process according to claim 7 wherein said copolymer is a copolymer of ethylene, propylene and a minor amount of a diolefin.

9. The process according to claim 8 wherein the diolefin is dicyclopentadiene.

10. The process according to claim 7 wherein said catalyst is formed by admixing a trialkyl orthovanadate and an aluminum alkyl chloride.

11. The process according to claim 8 wherein said catalyst is formed by mixing a trialkyl vanadate and an aluminum alkyl chloride.

12. The process according to claim 1 comprising additional steps of (c) determining the composition of the copolymer in the product stream, (d) adjusting the rate of addition of at least one component of said feed to increase at least one of T and C, when said composition is greater than the specific comonomer composition and to decrease at least one of T and C, when said composition is smaller than the specific comonomer composition, T being the residence time and C the total catalyst concentration, and (e) continuing steps (a) and (b) whereby the copolymer having the specific comonomer composition is produced.

13. The process according to claim 12 wherein in step (d) the residence time T is maintained constant.

14. The process according to claim 12 wherein in step (d) the total catalyst concentration in the reactor is maintained constant.

15. The process according to claim 10 wherein the aluminum alkyl chloride is aluminum ethyl dichloride.

References Cited by the Examiner

UNITED STATES PATENTS 3,008,938  11/1961  Irvin _____ 260—88.2
3,189,590   6/1965  Coover _____ 260—88.2

FOREIGN PATENTS 857,183  12/1960  Great Britain.

OTHER REFERENCES

Billmeyer: Textbook of Polymer Science, Interscience Publishers, New York (1962), page 324 relied on.

JOSEPH L. SCHOFER, *Primary Examiner.*

JAMES A. SEIDLECK, *Examiner.*

M. B. KURTZMAN, *Assistant Examiner.*